Figure 1:
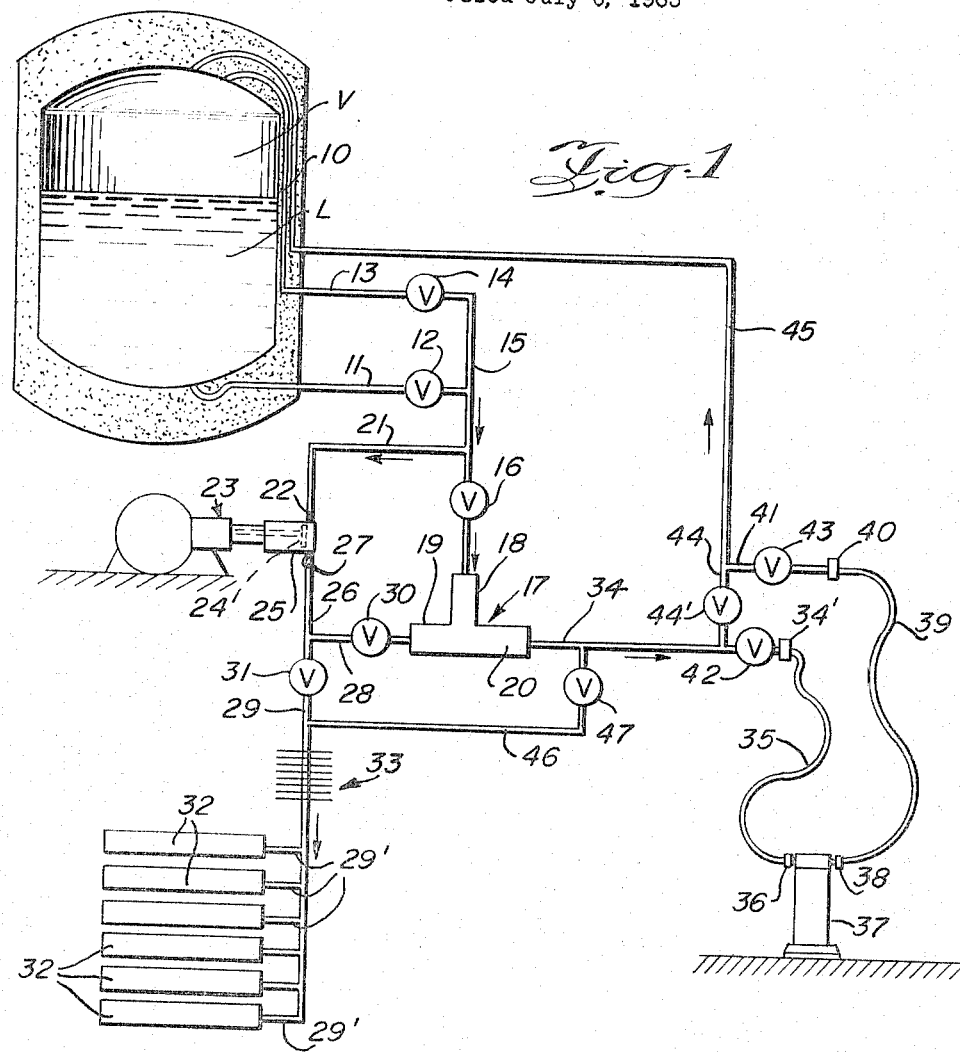

INVENTOR
Fredrick L. Walter
ATTORNEY

United States Patent Office 3,302,418
Patented Feb. 7, 1967

3,302,418
METHOD AND APPARATUS FOR
HANDLING LIQUIDS
Frederick L. Walter, Rolling Meadows, Ill., assignor to
Chemetron Corporation, Chicago, Ill., a corporation of
Delaware
Filed July 6, 1965, Ser. No. 469,457
7 Claims. (Cl. 62—52)

This invention relates to method and apparatus for handling liquids, being particularly adapted to fill vessels with cryogenic liquids or gases.

In accordance with the method of the invention, there is provided a source of cold liquid gas material, which liquid is continuously conducted away from the source and is passed to a pump, by which the liquid is pressurized and the pressurized liquid is greatly accelerated to form a continuous high velocity liquid stream; and additional liquid from the same source is continuously conducted to the liquid stream to effect aspiration of such additional liquid into the high velocity liquid stream.

It is one of the purposes of the invention to provide apparatus for carrying out the method in which an ejector is used along with a pump supplied with liquid from a common liquid source. This arrangement provides substantially increased liquid capacity over an arrangement which does not have an ejector. Liquid from a source of liquid supply is pumped through the one inlet passage of the ejector, and liquid from the same source, supplied to the other inlet passage of the ejector, is aspirated through its outlet passage. The apparatus of the invention is simple in construction and relatively easy and economical to operate and maintain. The apparatus can be used for filling liquid into one or more vessels and/or for filling vapor into vessels. When vessels are being filled with cryogenic liquid, the vapor formed in the containers as they are being filled is vented back to the source of liquid supply.

Figure 2:
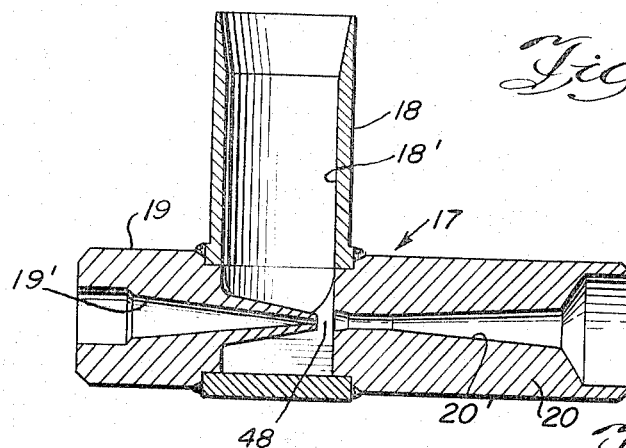

In the drawings:

FIGURE 1 is a schematic view showing apparatus for carrying out the method of the invention; and FIGURE 2 is an enlarged sectional view of an ejector shown in FIGURE 1.

Referring now to the drawing, there is shown a vessel 10 containing liquid, for example, cryogenic liquid L. Vapor V is disposed in the vessel 10 in the space above the liquid L. A conduit 11 communicating with the bottom of the vessel 10 contains a valve 12 and a conduit 13 communicating with the top of the vessel 10 contains a valve 14. The conduits 11 and 13 are connected to a conduit 15 which contains a valve 16.

An ejector generally indicated at 17 is shown to have inlets 18 and 19 and an outlet 20 having inlet passages 18' and 19' and an outlet passage 20', respectively. A conduit 21 connected to the conduit 15 downstream of the conduits 11 and 13 and upstream of the valve 16 is connected to the low pressure side 22 of piston-type pump 23 having a reciprocating piston 24 operating in a cylinder 25. A conduit 26 connects a high pressure side 27 of the pump 23 to conduits 28 nad 29 containing valves 30 and 31, respectively. The conduit 28 is connected to the inlet 19. The conduit 29 is connected to the inlet 19. The conduit 29 is connected to vessels, in particular cylinders 32, by branch conduits 29'. The conduit 29 contains a vaporizer 33 by means of which liquid passing through the conduit 29 is vaporized and only vapor is delivered to the branch conduits 29' and the cylinders 32.

A conduit 34 is connected at one end to the outlet 20 and at the other end to a coupling 34'. A flexible conduit 35 is connected to the coupling 34' and to a quick-release coupling 36 which is adapted to be connected to a vessel, in particular a cylinder 37. A quick-release coupling 38, adapted to be connected to the cylinder 37, is connected to a flexible conduit 39 which in turn is connected by coupling 40 to a conduit 41. Conduits 34 and 41 contain valves 42 and 43, respectively. A conduit 44 connects the conduit 34 upstream of the valve 42 with the conduit 41 downstream of the valve 43. The conduits 41 and 44 are connected to a conduit 45 which provides communication with the top of the vessel 10 for the return of liquid and/or vapor to the vessel 10.

A conduit 46 containing a valve 47 is connected at one end to the conduit 34 between the outlet 20 of the ejector 17 and the conduit 44, and at the other end to the conduit 29 downstream of the valve 31 and upstream of the vaporizer 33.

Referring now to FIGURE 2 of the drawing, the passage 19' is shown to converge toward the passage 20'. The passages 19' and 20' are axially aligned and together form a Venturi. The passage 19' terminates short of the passage 20' as indicated at 48 to permit liquid to be aspirated from the passage 18'. The passage 18' is sufficiently large to obviate cavitation and so that vapor in the ejector 17 will pass upwardly out of the passage 18' through the conduits 15 and 13 to the vessel 10. The conduit 15 is sufficiently large simultaneously to conduct liquid in a downward direction and vapor in an upward direction, and the conduit 13 is sufficiently large to conduct vapor from the conduit 15 to the vessel 10. As the passage 18' extends in an upward direction any vapor existing in the passage 18' will be free to ascend and be returned to the vessel 10. To accomplish gravitation of liquid L from the vessel 10 through the conduits 11 and 15, the inlet passage 18' is disposed below the liquid L in the vessel 10.

In operation, liquid L can pass through the conduits 11 and 15 to the inlet passages 18' and through the conduit 21, assuming the valves 12 and 16 are open. The pump 23 forces liquid under high pressure into and through the conduit 26 and through the conduits 28 and 29, or either one of them, depending upon which valve or valves 30 and 31 are open. Assuming the valve 30 is open, liquid entering the passage 19' will aspirate liquid from the passage 18' into the passage 20' and, assuming the valve 42 is open, liquid will pass through the conduits 34 and 35 into the vessel 37. The valve 43 should be open so that vapor formed while filling the vessel 37 can be returned via conduit 45 to the vessel 10. While the vessel 37 is being filled the valve 44' should be closed; but the valve 44' can be opened and the valves 34 and 43 closed to return the liquid in conduit 34, through conduits 44 and 45, to the vessel 10.

When the vessels 32 are to be filled with vapor one of the valves 31 and 47 is open and the other one is closed, thus liquid can pass to the vaporizer 33 through one or the other of valves 31 and 47.

When the pump 23 is operating and the valve 31 is open, pressure pulsations or surges of liquid from the pump 23 will be cushioned by the gas in the vessels 32.

Other embodiments and modifications of this invention will suggest themselves to those skilled in the art, and all such of these as come within the spirit of this invention are included within its scope as best defined by the appended claims.

I claim:

1. Apparatus for handling cryogenic liquids, comprising: an ejector having first and second inlets and an outlet, a pump for pumping liquid at high pressure into said first inlet, and conduit means for conducting liquid from a low pressure common liquid source directly to said second inlet and directly to said pump.

2. Apparatus for handling cryogenic liquids, comprising: an ejector having first and second inlet passages and an outlet passage, said first inlet passage and said outlet passage being generally axially aligned, said second inlet extending in an upward direction, a pump for pumping liquid into said first inlet passage, and conduit means connected to a low pressure source of liquid supply for conducting liquid to said pump and also to said second inlet passage and for conducting vapor out of said second inlet passage.

3. Apparatus for handling cryogenic liquids, comprising: an ejector having first and second inlet passages and an outlet passage, said first inlet passage and said outlet passage being axially aligned and together forming a Venturi, conduit means connected to a low pressure source of liquid supply disposed above said second inlet passage and also to said second inlet passage by which liquid can be supplied to said second inlet passage and vapor formed in said ejector can be vented to said source of liquid supply, a pump for pumping liquid at high pressure from the low pressure source of liquid supply into said first inlet passage, and conduit means connected to said outlet passage and adapted to be connected to a vessel for filling the vessel.

4. Apparatus for handling cryogenic liquids, comprising: an ejector having a pair of inlets and an outlet, a conduit connected to a low pressure source of liquid supply and to one of said inlets, a pump, a conduit connected to the source of liquid supply and to the low pressure side of said pump and the other inlet of said ejector, a conduit connected to said outlet and adapted to be connected to a vessel for filling the vessel with liquid, and a vent conduit connected to said vessel for venting the vessel to the source of liquid supply.

5. Apparatus for handling cryogenic liquids, comprising: an ejector having a pair of inlets and an outlet, a pump having a low pressure side and a high pressure side, means for supplying low pressure liquid to one of said inlets and also to the low pressure side of said pump, a first conduit connecting the high pressure side of said pump and the other of said inlets, a second conduit connected to said outlet and adapted to be connected to a vessel for filling the vessel with liquid, and conduit means communicating with one of said first and second conduits and adapted to be connected to another vessel, and means in heat exchange relationship with said conduit means for vaporizing liquid in said conduit means so that said other vessel can be filled with vapor.

6. Apparatus for handling cryogenic liquids, comprising: an ejector having a pair of inlets and an outlet, a pump having a high pressure side and a low pressure side, means for supplying low pressure liquid to one of said inlets and to the low pressure side of said pump, a first conduit connecting the high pressure side of said pump and the other of said inlets, a second conduit connected to said outlet and adapted to be connected to a vessel for filling the vessel with liquid, conduit means adapted to be connected to another vessel, said conduit means including third and fourth conduits connected respectively to said first and second conduits and to each other, valve means for said third and fourth conduits, and means in heat exchange relationship with said conduit means for vaporizing liquid so that the other vessel can be filled with vapor.

7. Method of handling cryogenic liquids, comprising the steps of: providing a low pressure source of liquid, conducting liquid away from the source through a first flow path, increasing the pressure of such conducted liquid, thereafter greatly accelerating the pressurized liquid to form a high velocity liquid stream, and conducting additional low pressure liquid from the same source through a second flow path separate and distinct from said first flow path to the high velocity liquid stream to effect aspiration of such additional liquid from said second flow path into the high velocity liquid stream.

References Cited by the Examiner
UNITED STATES PATENTS

| | | | |
|---|---|---|---|
| 2,657,541 | 11/1953 | Schilling | 62—55 |
| 2,711,085 | 6/1955 | Anderson | 62—55 X |
| 2,764,873 | 10/1956 | Mooyaart | 62—55 |
| 3,091,096 | 5/1963 | Rendos et al. | 62—52 |
| 3,183,678 | 5/1965 | Hosford | 62—52 |

FOREIGN PATENTS

| | | |
|---|---|---|
| 1,272,798 | 8/1961 | France. |

LLOYD L. KING, *Primary Examiner.*